United States Patent

Tabota et al.

[11] Patent Number: 5,490,422
[45] Date of Patent: Feb. 13, 1996

[54] ACCELERATION SENSOR

[75] Inventors: Jun Tabota; Jiro Inoue; Toshihiko Unami, all of Nagaokakyo, Japan

[73] Assignee: Murata Manufacturing Co., Ltd., Japan

[21] Appl. No.: 210,370

[22] Filed: Mar. 18, 1994

[30] Foreign Application Priority Data

| Mar. 19, 1993 | [JP] | Japan | 5-060144 |
| Mar. 19, 1993 | [JP] | Japan | 5-060145 |
| Jul. 2, 1993 | [JP] | Japan | 5-164577 |
| Jul. 13, 1993 | [JP] | Japan | 5-173018 |
| Feb. 21, 1994 | [JP] | Japan | 6-022454 |

[51] Int. Cl.⁶ .............................. G01P 15/08; G01P 3/22
[52] U.S. Cl. .............................................. 73/514.34
[58] Field of Search .................. 73/517 R, 518, 73/1 D

[56] References Cited

U.S. PATENT DOCUMENTS

| 4,363,993 | 12/1982 | Nishigaki et al. | 310/332 |
| 5,128,581 | 6/1992 | Nakyama et al. | 310/329 |
| 5,216,315 | 6/1993 | Terada et al. | 310/329 |
| 5,233,256 | 8/1993 | Hayashi et al. | 310/317 |
| 5,388,459 | 2/1995 | Inoue et al. | 73/517 AV |

FOREIGN PATENT DOCUMENTS

| 2316130 | 10/1974 | Germany . |
| 3817354 | 1/1988 | Germany . |
| 9313426 | 7/1993 | WIPO . |

OTHER PUBLICATIONS

U.S. Patent Application Serial No. 07/950,478, filed Sep. 24, 1992.
U.S. Patent Application Serial No. 08/163,436, filed Dec. 8, 1993.

*Primary Examiner*—Richard Chilcot
*Assistant Examiner*—Max H. Noori
*Attorney, Agent, or Firm*—Ostrolenk, Faber, Gerb & Soffen

[57] ABSTRACT

An acceleration sensor having a specific insensitive direction along which no acceleration is detectable and an insulated case supporting the acceleration sensor body. The acceleration sensor body is so mounted on the insulated case that the insensitive direction is along a direction which is neither parallel nor perpendicular to a surface of the insulated case to be mounted on an external device.

14 Claims, 6 Drawing Sheets

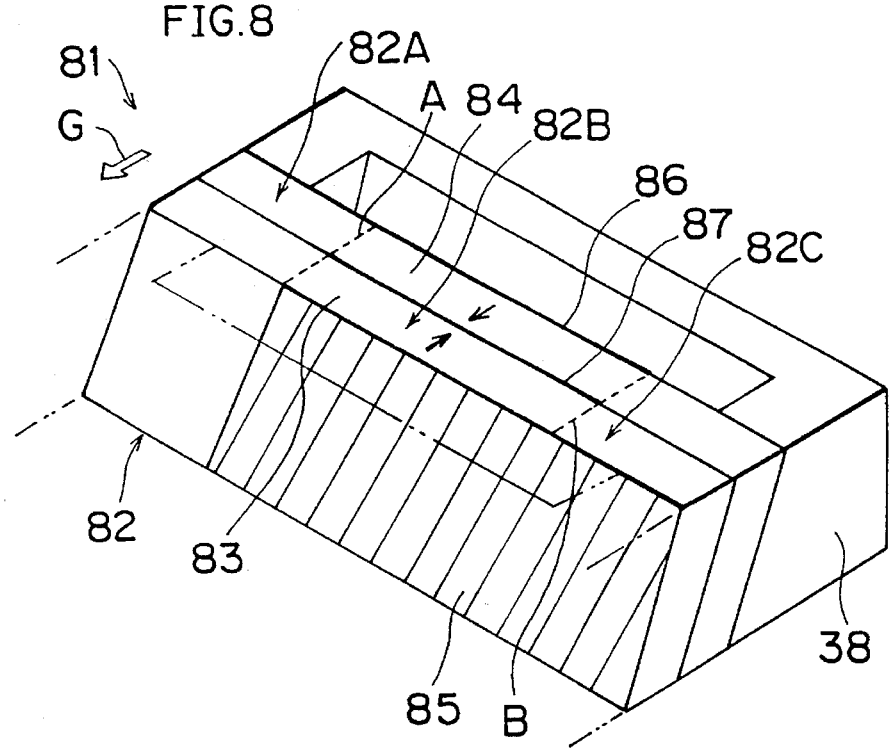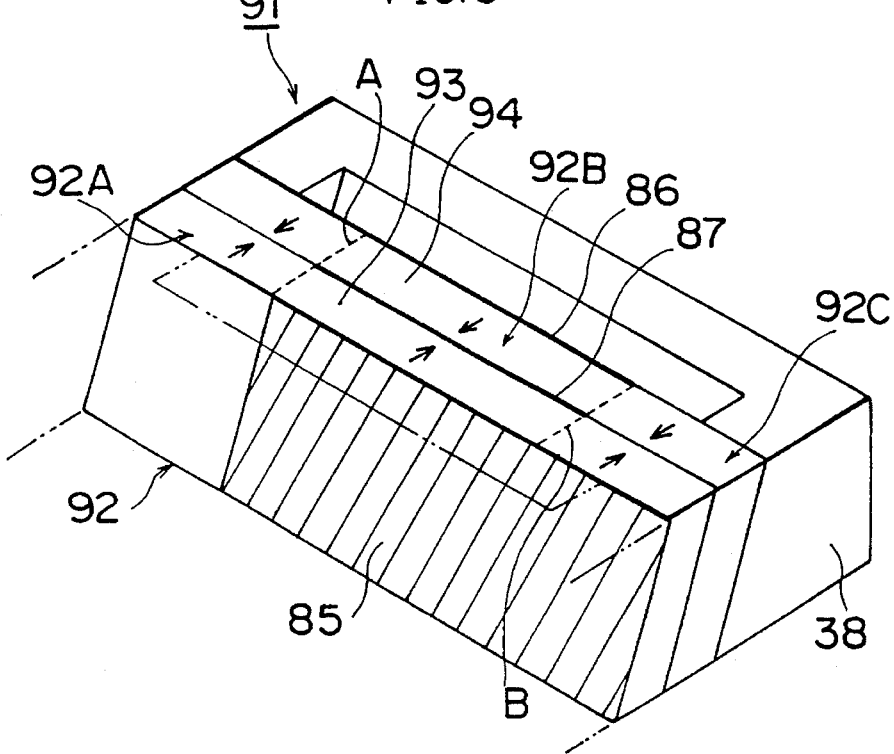

ACCELERATION SENSOR

BACKGROUND OF THE INVENTION

1. Field of the Invention

The present invention relates to an acceleration sensor, and more particularly, it relates to an acceleration sensor which is formed by a bimorph piezoelectric element.

2. Description of the Background Art

In general, an acceleration sensor employing a bimorph piezoelectric element is known in the art. An example of such an acceleration sensor is now described with reference to FIG. 1.

An acceleration sensor 1 comprises a sensor body 2 which is formed by a bimorph piezoelectric element, and an insulated case 3. The acceleration sensor 1 is generally mounted on a mounting substrate 4, as shown in FIG. 1.

The sensor body 2 is formed by a combination of first and second piezoelectric ceramic plates 5 and 6. First and second signal electrodes 7 and 8 are formed on outer major surfaces of the first and second piezoelectric ceramic plates 5 and 6 respectively. The first and second signal electrodes 7 and 8 are opposed to each other through the piezoelectric ceramic plates 5 and 6 at a central portion of the sensor body 2. Further, an intermediate electrode 9 is formed between the first and second piezoelectric ceramic plates 5 and 6. Namely, the first and second piezoelectric ceramic plates 5 and 6 are pasted to each other through the intermediate electrode 9. The intermediate electrode 9 is formed along the portion where the first and second signal electrodes 7 and 8 are opposed to each other.

The first and second piezoelectric ceramic plates 5 and 6 are polarized as shown by broken arrows in FIG. 1. In other words, the first and second piezoelectric ceramic plates 5 and 6 are uniformly polarized along thicknesses thereof, in directions which are opposite to each other.

The first and second signal electrodes 7 and 8 are drawn out on first and second ends along the longitudinal direction of the sensor body 2, respectively.

The insulated case 3 has first and second holding members 10 and 11 and flat plate type case substrates 12 and 13. The first and second holding members 10 and 11 are fixed to outer major surfaces of the sensor body 2 in portions close to both ends thereof, respectively. The first and second holding members 10 and 11 have cavities 10a and 11a, respectively. These cavities 10a and 11a are adapted to define spaces for allowing displacement of the sensor body 2. Thus, the sensor body 2 is supported by the first and second holding members 10 and 11 in the form of a center beam.

Still another cavity 12a is formed in an upper surface of the case substrate 12, in order to define a space for allowing displacement of the sensor body 2. A further cavity is also formed in a lower surface of the case substrate 13 which is shown in phantom lines in FIG. 1, to allow displacement of the sensor body 2.

The first and second holding members 10 and 11 are fixed to both sides of the sensor body 2 and the case substrates 12 and 13 are bonded to upper and lower portions thereof as described above, so that the sensor body 2 is stored in the insulated case 3. Terminal electrodes (not shown in FIG. 1) are formed on both end surfaces of the insulated case 3, to be connected with the first and second signal electrodes 7 and 8 respectively.

FIG. 2 is a perspective view showing another exemplary conventional acceleration sensor 21. The acceleration sensor 21 has a sensor body 22 which is similar in structure to the sensor body 2 of the acceleration sensor 1 shown in FIG. 1. Since the sensor body 22 itself is similar in structure to the sensor body 2, portions identical to those in FIG. 1 are denoted by similar reference numerals.

In the acceleration sensor 21, the sensor body 22 is so arranged that major surfaces of first and second piezoelectric ceramic plates 5 and 6 are in a direction which is parallel to a major surface 4a of a mounting substrate 4. First and second holding members 23 and 24 are arranged on upper and lower portions of the sensor body 22 respectively. The first and second holding members 23 and 24 are similar in structure to the first and second holding members 10 and 11 shown in FIG. 1. The acceleration sensor 21 is different from the acceleration sensor 1 in that the sensor body 22 is arranged in the aforementioned direction while the first and second holding members 23 and 24 and case substrates 25 and 26 are arranged in response to the direction of the sensor body 22, and the respective elements are similar to those of the acceleration sensor 1.

In the acceleration sensors 1 and 21 shown in FIGS. 1 and 2, the sensor bodies 2 and 22 exhibit excellent sensitivity with respect to acceleration acting along thicknesses thereof. However, the sensor bodies 2 and 22 have no sensitivity with respect to acceleration acting along widths thereof. In other words, there are specific insensitive directions Q along which no acceleration is detectable.

When a bottom surface 3a of the insulated case 3 is fixed onto the major surface 4a of the mounting substrate 4 for mounting the acceleration sensor 1 on the mounting substrate 4, therefore, the sensor body 2 exhibits maximum sensitivity with respect to acceleration acting along a direction X which is parallel to the major surface 4a, while the same has no sensitivity with respect to acceleration acting along a direction Z which is perpendicular to the major surface 4a.

When the acceleration sensor 21 is similarly mounted on a major surface 4a of a mounting substrate 4 as shown in FIG. 2, further, the sensor body 22 exhibits maximum sensitivity with respect to acceleration acting along a direction Z which is perpendicular to the major surface 4a, while the same has no sensitivity with respect to acceleration acting along a direction X which is parallel to the major surface 4a.

SUMMARY OF THE INVENTION

In order to solve the aforementioned problems of the conventional acceleration sensors, the present invention provides an acceleration sensor exhibiting detection sensitivity to some extent with respect to acceleration acting along each of directions which are parallel and perpendicular to a mounting surface therefor, thereby enabling reliable detection of the acceleration in each direction.

According to a wide aspect of the present invention, an acceleration sensor comprises an acceleration sensor body having a specific insensitive direction along which no acceleration is detectable, and a case supporting the sensor body and having a mounting surface to be mounted on an external device. The sensor body is so supported by the case that its insensitive direction is along a direction which is neither parallel nor perpendicular to the mounting surface of the case.

According to the inventive acceleration sensor, the sensor body is so arranged that its insensitive direction is along a direction which is neither parallel nor perpendicular to the mounting surface of the case. Therefore, the sensor body has sensitivity to some extent also with respect to acceleration acting along a direction which is parallel or perpendicular to the mounting surface of the case, whereby it is possible to reliably detect the acceleration along this direction.

According to a specific aspect of the present invention, the acceleration sensor body is formed by a bimorph piezoelectric element.

This bimorph piezoelectric element preferably comprises first and second piezoelectric ceramic plates each having a pair of opposite major surfaces, a first signal electrode which is formed on a first major surface of the first piezoelectric ceramic plate, a second signal electrode which is formed on a first major surface of the second piezoelectric ceramic plate, and an intermediate electrode which is arranged between second major surfaces of the first and second piezoelectric ceramic plates, and the first and second piezoelectric ceramic plates are bonded to each other through the intermediate electrode.

According to a specific preferable aspect of the present invention, the sensor body has such first to third regions that stress is caused in different directions in adjacent ones of the regions upon action of acceleration while the first and second piezoelectric ceramic plates are polarized in opposite directions in the second region which is located at the center, and the acceleration sensor further comprises means for preventing charges which are opposite in polarity to those generated in the second region from being drawn from the signal electrodes in the first and third regions. According to this structure, charges which are generated in response to stress caused by action of acceleration are drawn out from the first and second signal electrodes in the second region which is located at the center when the sensor body is deflected, while no charges of opposite polarity are drawn from the signal electrodes in the first and third regions, due to the aforementioned means. Thus, it is possible to improve detection sensitivity as compared with the conventional acceleration sensors, as clearly understood from embodiments of the present invention described later.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a typical perspective view for illustrating an acceleration sensor according to a third embodiment of the present invention;

FIG. 9 is a typical perspective view for illustrating an acceleration sensor according to a fourth embodiment of the present invention.

DESCRIPTION OF THE PREFERRED EMBODIMENTS

Preferred embodiments of the present invention are now described with reference to the drawings.

First Embodiment

Figure 3:
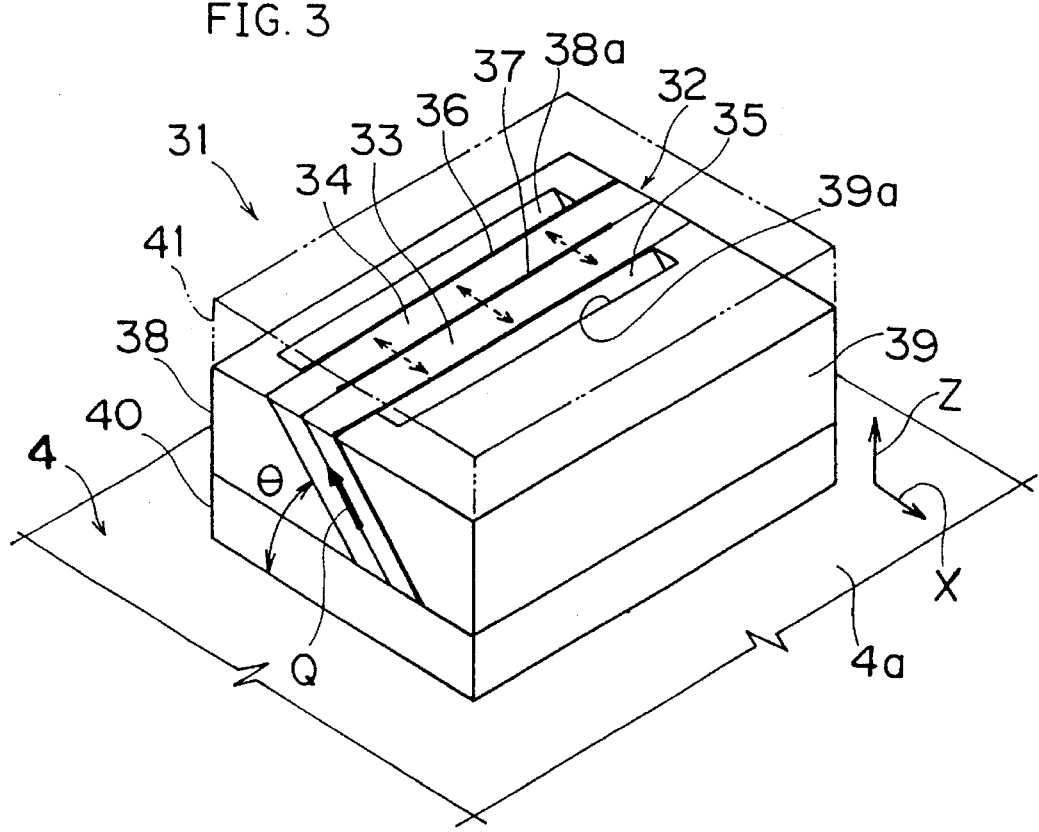
FIG. 3 is a perspective view for illustrating an acceleration sensor according to a first embodiment of the present invention.

FIG. 3 is a perspective view for illustrating an acceleration sensor 31 according to a first embodiment of the present invention. The acceleration sensor 31 has a sensor body 32 of a bimorph piezoelectric element. The sensor body 32 is formed by first and second piezoelectric ceramic plates 33 and 34, which are pasted to each other. The first and second piezoelectric ceramic plates 33 and 34 are polarized as shown by arrows in broken lines in FIG. 3. In other words, the first and second piezoelectric ceramic plates 33 and 34 are uniformly polarized along thicknesses thereof, in directions which are opposite to each other. The piezoelectric ceramic plates 33 and 34 are made of a ceramic material such as lead titanate zirconate piezoelectric ceramics, for example.

First and second signal electrodes 35 and 36 are formed on outer major surfaces of the first and second piezoelectric ceramic plates 33 and 34 respectively. The first and second signal electrodes 35 and 36 are opposed to each other through the piezoelectric ceramic plates 33 and 34 at a central portion of the sensor body 32. The first signal electrode 35 is so formed as to extend from the central portion to an end of the sensor body 32, while the second signal electrode 36 is so formed as to extend from the central portion to another end of the sensor body 32.

The first and second piezoelectric ceramic plates 33 and 34 are bonded to each other through an intermediate electrode 37. This intermediate electrode 37 is formed between the portion where the first and second signal electrodes 35 and 36 are opposed to each other.

The feature of the acceleration sensor 31 according to this embodiment resides in the direction of arrangement of the sensor body 32. Due to the aforementioned structure of the sensor body 32, charges which are based on displacement of the first and second piezoelectric ceramic plates 33 and 34 along thicknesses thereof are drawn from the first and second signal electrodes 35 and 38 upon such displacement, while major surfaces of the piezoelectric ceramic plates 33 and 34 are inclined at an angle θ with respect to a major surface 4a of a mounting plate 4, as shown in FIG. 3. On the other hand, upper and lower surfaces of the sensor body 32 extend in parallel with the major surface 4a of the mounting substrate 4. Further, a pair of side surfaces of the sensor body 32 extend in a direction which is perpendicular to the major surface 4 of the mounting substrate 4a.

First and second holding members 38 and 39 are arranged on both sides of the sensor body 32. The first and second holding members 38 and 39 are fixed to the sensor body 32 in portions close to both ends of the sensor body 32 along its longitudinal direction. Thus, the sensor body 32 is supported by the first and second holding members 38 and 39 in the form of a center beam.

The first and second holding members 38 and 39 are provided with cavities 38*a* and 39*a*. These cavities 38*a* and 39*a* are adapted to define spaces for allowing displacement of the sensor body 32 which is supported in the form of a center beam.

Figure 1:
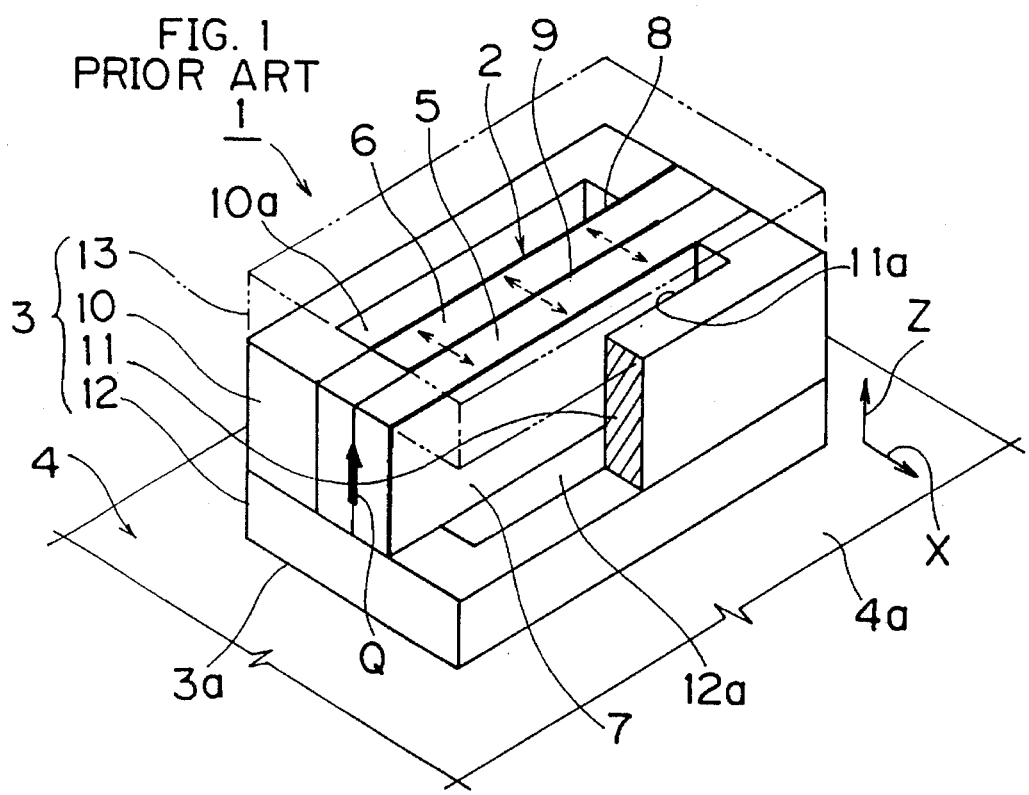
FIG. 1 is a perspective view for illustrating an exemplary conventional acceleration sensor.
Figure 2:
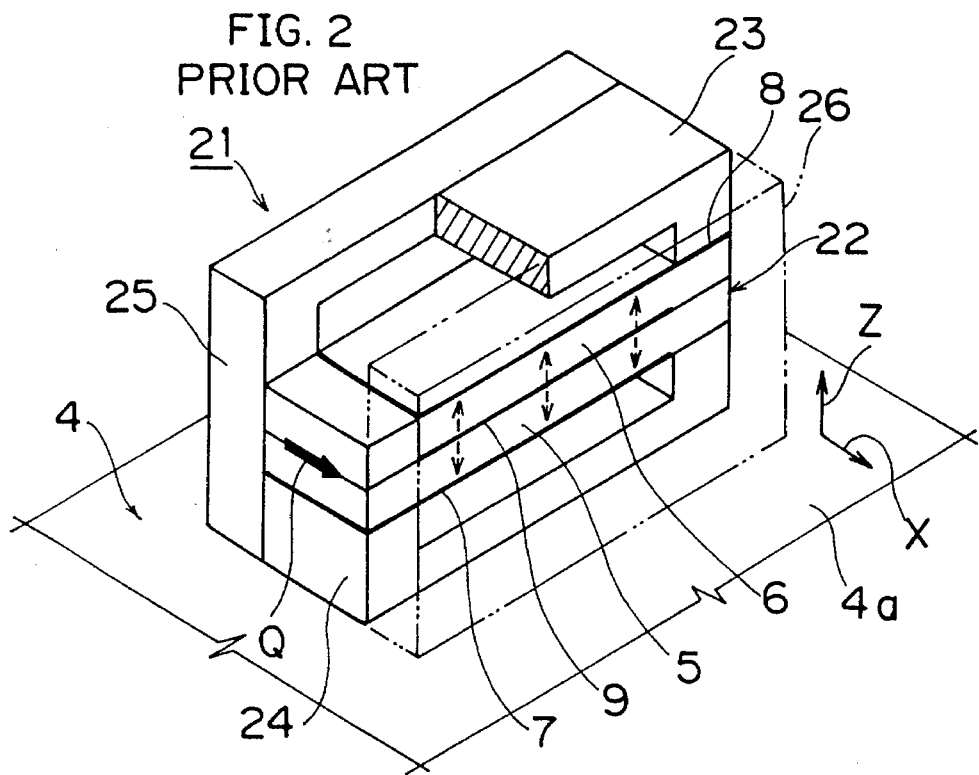
FIG. 2 is a perspective view for illustrating another exemplary conventional acceleration sensor.

Case substrates 40 and 41 (only the outline of the case substrate 41 is shown in phantom lines) are fixed to lower and upper portions of the sensor body 32 and the first and second holding members 38 and 39. Cavities (not shown) are provided in an upper surface of the case substrate 40 and a lower surface of the other case substrate 41, to allow displacement of the sensor body 32. These cavities are formed in a similar manner to the cavity 12*a* of the case substrate 12 which is provided in the conventional sensor 1 shown in FIG. 1.

The first and second holding members 38 and 39 and the case substrates 40 and 41 form an insulated case in the present invention. The first and second holding members 38 and 39 and the case substrates 40 and 41 can be made of proper insulating materials such as insulating ceramics such as alumina or synthetic resin.

First and second terminal electrodes (not shown) are formed on both end surfaces of the acceleration sensor 31, to be electrically connected with the first and second signal electrodes 35 and 36 respectively.

The case substrates 40 and 41 forming the insulated case may be made of a material having a high dielectric constant such as dielectric ceramics, for example, so that a plurality of opposite electrodes are formed on an upper surface of the case substrate 40 or 41 to form a capacitor and the electrodes for forming the capacitor are electrically connected in parallel with the sensor body 32.

In the acceleration sensor 31, the sensor body 32 whose major surfaces are inclined at the angle $\theta$ with respect to the major surface 4*a* of the mounting substrate 4 has an insensitive direction along arrow Q in FIG. 3. When the acceleration sensor 31 is mounted on the major surface 4*a* of the mounting substrate 4 as shown in FIG. 3, therefore, the sensor body 32 has sensitivity to some extent with respect to acceleration acting along each of directions X and Z which are parallel and perpendicular to the major surface 4*a* respectively. In other words, it is possible to reliably detect each acceleration acting along the direction X or Z. This is now described in more detail with reference to FIG. 4.

Figure 4:
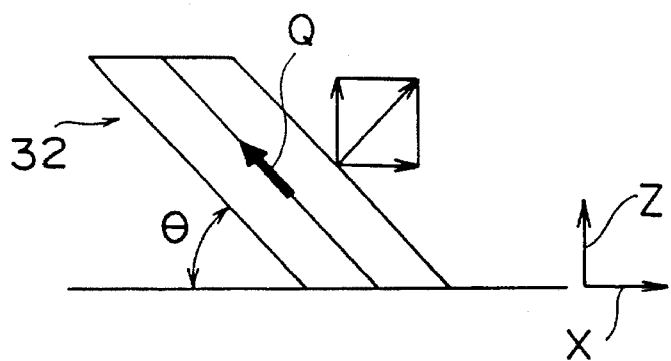
FIG. 4 is a typical side elevational view for illustrating an insensitive direction of the acceleration sensor according to the embodiment shown in FIG. 3.

As shown in FIG. 4, the maximum sensitivity in the sensor body 32 is obtained along the direction of stacking of the first and second piezoelectric ceramic plates 33 and 34. When acceleration acts along arrow X in FIG. 3 in parallel with the major surface 4*a* of the mounting substrate 4, the sensor body 32 exhibits detection sensitivity which is $\sin\theta$ times the maximum detection sensitivity, while detection sensitivity which is $\cos\theta$ times the maximum detection sensitivity is obtained when acceleration acts along arrow Z perpendicularly to the mounting surface 4*a*.

The angle $\theta$ of inclination can be properly set in a range of 0° to 90° excluding 0° and 90°, while this angle $\theta$ is preferably selected at about 45°, in order to implement relatively high detection sensitivity in each of the directions X and Z. When the angle $\theta$ of inclination which is properly set within the aforementioned range is changed, the sensitivity ratio of the acceleration sensor 31 is varied with respect to acceleration acting along the directions X and Z. Therefore, the angle $\theta$ of inclination is set in consideration of working conditions of the acceleration sensor 31.

A method of manufacturing the acceleration sensor 31 according to the first embodiment is now described with reference to FIGS. 5A and 5B.

Figure 5A:
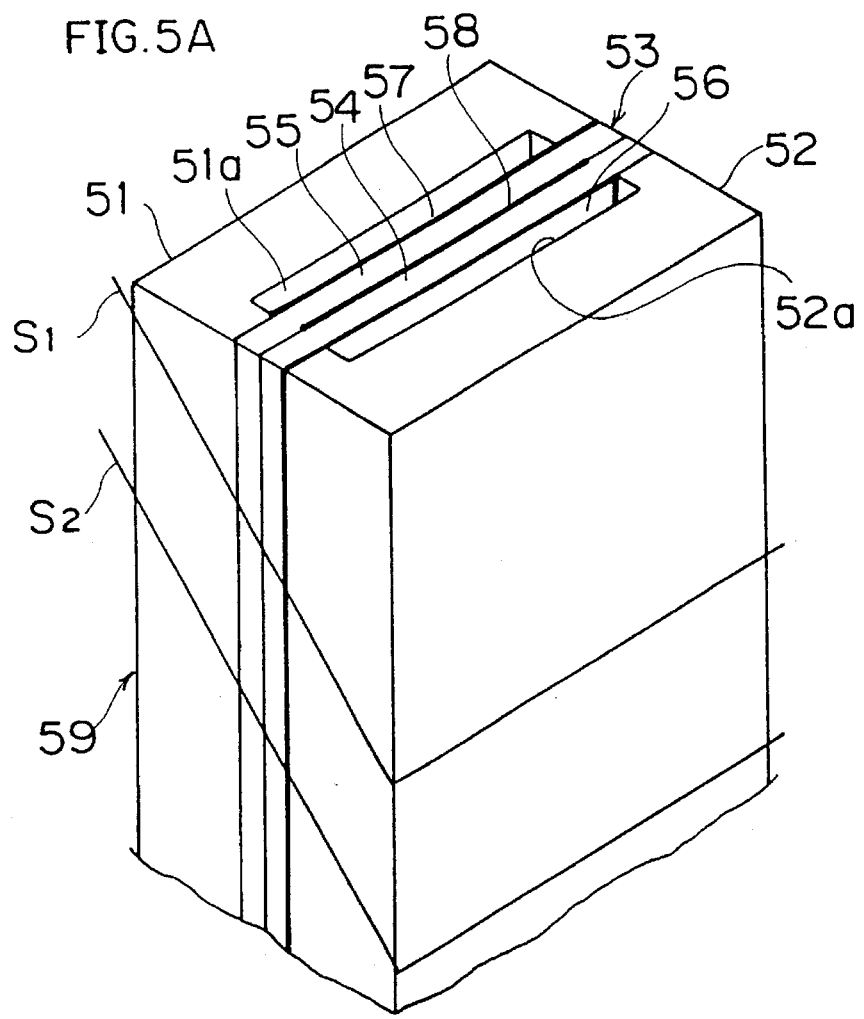
FIGS. 5A and 5B are perspective views for illustrating steps, which are included in those for manufacturing the acceleration sensor shown in FIG. 3, for cutting a principal part of the acceleration sensor from a mother laminate respectively.

First, a mother sensor body 53 is arranged between mother ceramic plates 51 and 52 for forming the holding members 38 and 39, as shown in FIG. 5A. The mother sensor body 53 is formed by mother piezoelectric ceramic plates 54 and 55, which are pasted to each other. Further, electrode patterns 56 to 58 for forming the first and second signal electrodes 35 and 36 and the internal electrode 37 are provided on both major surfaces of the mother piezoelectric ceramic plates 54 and 55 respectively. Further, cavities 51*a* and 52*a* are formed in the mother ceramic plates 51 and 52 respectively. These cavities 51*a* and 52*a* are adapted to form the aforementioned cavities 38*a* and 39*a*, respectively.

Figure 5B:
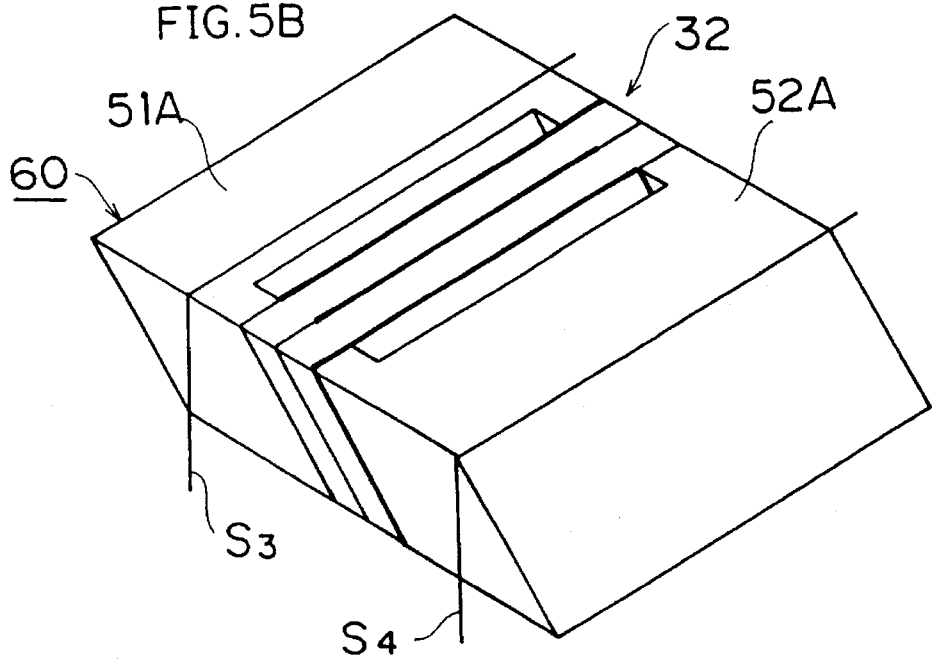

A mother laminate 59 shown in FIG. 5A is cut along cutting lines S1 and S2 shown in FIG. 5A, to obtain a laminate block 60 shown in FIG. 5B.

In the laminate block 60, mother ceramic substrate portions 51A and 52A are bonded to both sides of the sensor body 32. Then, this laminate block 60 is cut along cutting lines S3 and S4 shown in FIG. 5B, to obtain such a structure that the holding members 38 and 39 shown in FIG. 3 are bonded to both sides of the sensor body 32. Thereafter the case substrates 40 and 41 shown in FIG. 3 are bonded to lower and upper portions of this structure, thereby obtaining the acceleration sensor 31.

Second Embodiment

Figure 6:
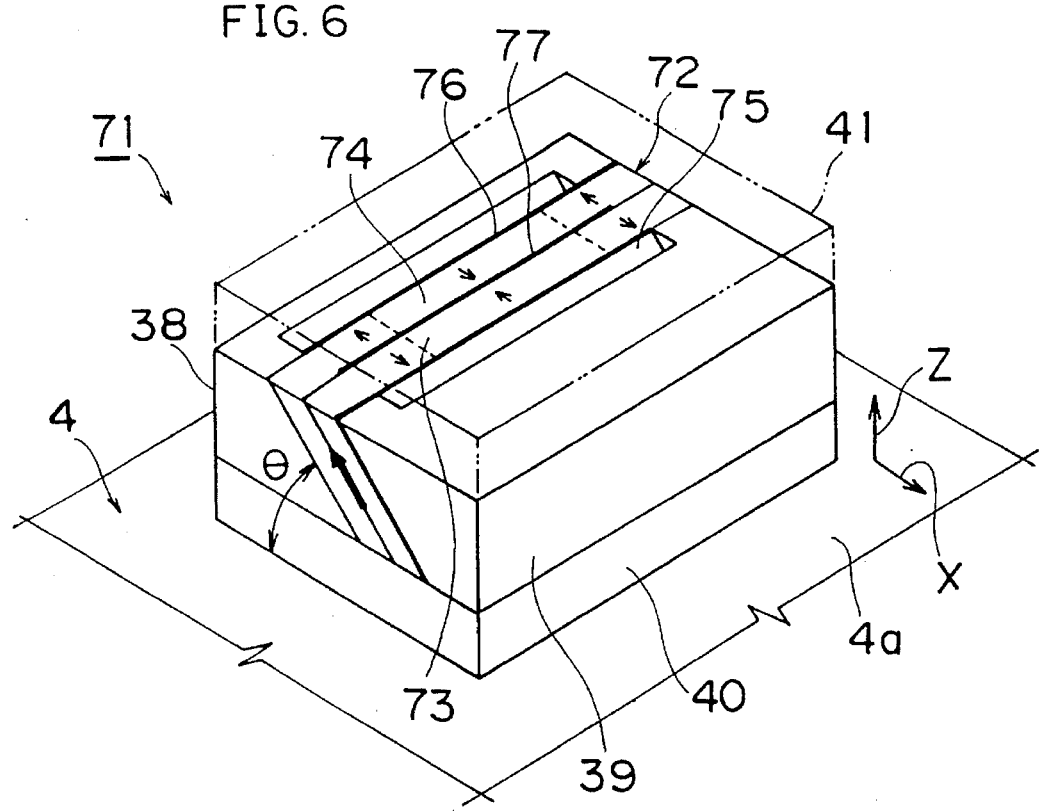
FIG. 6 is a perspective view for illustrating an acceleration sensor according to a second embodiment of the present invention.

FIG. 6 is a perspective view for illustrating an acceleration sensor 71 according to a second embodiment of the present invention. The acceleration sensor 71 according to the second embodiment has a sensor body 72. The second embodiment is similar in structure to the first embodiment except that the sensor body 72 is different from the sensor body 32. Therefore, portions other than those forming the sensor body 72 are denoted by the same reference numerals as those in FIG. 3, to omit redundant description.

The sensor body 72 has first and second piezoelectric ceramic plates 73 and 74. First and second signal electrodes 75 and 76 are formed on outer major surfaces of the first and second piezoelectric ceramic plates 73 and 74 respectively. The first and second piezoelectric substrates 73 and 74 are bonded to each other through an intermediate electrode 77. The sensor body 72 is inclined at an angle $\theta$ with respect to a major surface 4*a* of a mounting substrate 4, similarly to the sensor body 32 according to the first embodiment.

Figure 7:
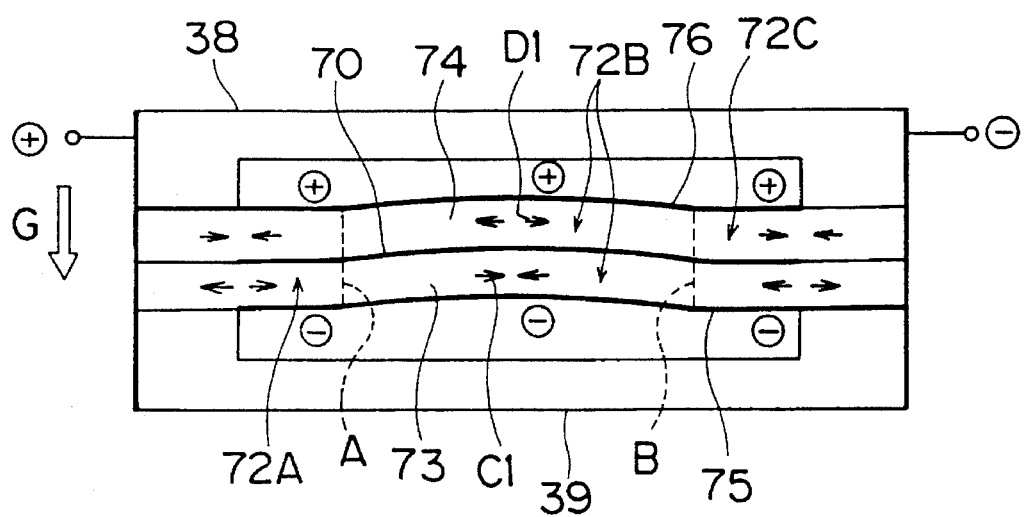
FIG. 7 is a typical plan view for illustrating a state of a sensor body which is displaced when acceleration acts on the acceleration sensor shown in FIG. 6 and charges generated at this time.

Also in the acceleration sensor 71 according to this embodiment, the sensor body 72 is supported in the form of a center beam. When acceleration acts along arrow G as shown in FIG. 7 in a typical plan view, the case is moved along this acceleration and the sensor body 72 is deformed by inertial force as shown in the figure. In this case, first to third regions 72A, 72B and 72C which are displaced in different manners are defined in the sensor body 72 along its longitudinal direction. Broken lines A and B show boundaries between the first to third regions 72A to 72C.

Namely, the first piezoelectric ceramic plate 73 is compressed as shown by arrow C1 and the second piezoelectric ceramic plate 74 is expanded as shown by arrow D1 in the second region 72B when the sensor body 72 is displaced as shown in FIG. 7.

In the first and third regions 72A and 72C, on the other hand, the first piezoelectric ceramic plate 73 is expanded and the second piezoelectric ceramic plate 74 is compressed. Thus, the first and second piezoelectric ceramic plates 73 and 74 define regions which are displaced in different manners along the longitudinal direction.

Referring again to FIG. 6, the piezoelectric ceramic plates 73 and 74 are polarized in opposite directions in the second region 72B. In the first piezoelectric ceramic plate 73, however, the first and third regions 72A and 72C are polarized in a direction which is opposite to the polarization direction of the second region 72b. Also in the second piezoelectric ceramic plate 74, the first and third regions 72A and 72C are polarized in a direction which is opposite to the polarization direction of the second region 72b.

When the sensor body 72 is displaced as shown in FIG. 7, therefore, minus polarity charges and plus polarity charges are generated on outer major surfaces of the first and second piezoelectric ceramic plates 73 and 74 respectively in the second region 72B. In addition, minus polarity charges and plus polarity charges are generated on the outer major surfaces of the first and second piezoelectric ceramic plates 73 and 74 respectively also in the first and third regions 72A and 72C.

Therefore, the charges generated in the aforementioned manners are drawn from the first and second signal electrodes 75 and 76, whereby it is possible to improve detection sensitivity as compared with the acceleration sensor 31 according to the first embodiment shown in FIG. 3.

In the acceleration sensor 31 according to the first embodiment, the piezoelectric ceramic plates 33 and 34 are uniformly polarized in the sensor body 32, whereby charges which are opposite in polarity to those in a second region corresponding to that shown in FIG. 7 are generated in first and third regions corresponding to those shown in FIG. 7. In the first piezoelectric ceramic plate 35, for example, charges which are generated on its outer major surface in the first and third regions are opposite in polarity to those generated in the outer major surface in the second region. Therefore, the charges which are generated in the central second region are canceled by those of opposite polarity generated in the first and third regions, to reduce detection sensitivity.

In the embodiment shown in FIG. 6, on the other hand, the piezoelectric ceramic plates 73 and 74 are polarized in the aforementioned manner, whereby charges of opposite polarity to those in the second region 72B are prevented from being drawn from the signal electrodes 75 and 76 in the first and third regions 72A and 72C. In other words, the aforementioned polarization structure forms the means for preventing charges which are opposite in polarity to those generated in the second region from being drawn from the signal electrodes in the first and third regions according to the present invention.

Third Embodiment

FIG. 8 is a perspective view for illustrating an acceleration sensor 81 according to a third embodiment of the present invention.

The acceleration sensor 81 according to the third embodiment is similar in structure to those of the first and second embodiments except that a sensor body 82 is formed in a different manner. Therefore, only the sensor body 82 is described.

The sensor body 82 has first and second piezoelectric ceramic plates 83 and 84. First and second signal electrodes 85 and 86 are formed on outer major surfaces of the piezoelectric ceramic plates 83 and 84 respectively. Further, an intermediate electrode 87 is formed between the first and second piezoelectric ceramic plates 83 and 84. Broken lines A and B in FIG. 8 show boundaries between first to third regions 82A to 82C corresponding to those described above with reference to the second embodiment.

According to this embodiment, the piezoelectric ceramic plates 83 and 84 are polarized in opposite directions in the second region 82B. On the other hand, the piezoelectric ceramic plates 83 and 84 are not polarized in the first and third regions 82A and 82C. Further, the first and second signal electrodes 85 and 86 are opposed to each other only in the second region 82B. Similarly, the intermediate electrode 87 is formed only in the second region 82B.

When acceleration acts along arrow G, the sensor body 82 is displaced similarly to the sensor body 72 shown in FIG. 7. In this case, charges which are based on such displacement are generated on outer major surfaces of the piezoelectric ceramic plates 83 and 84 in the second region 82B of the sensor body 82. These charges which are generated on the basis of the displacement are drawn from the first and second signal electrodes 85 and 86. On the other hand, substantially no charges are generated in the first and third regions 82A and 82C since the piezoelectric ceramic plates 85 and 84 are not polarized in these regions. Further, the signal electrodes 85 and 86 are opposed to each other only in the second region 82B. Thus, only the charges which are generated in the second region 82B are reliably drawn from the signal electrodes 85 and 86, whereby it is possible to improve detection sensitivity as compared with the acceleration sensor 31 according to the first embodiment.

Namely, the means for preventing charges which are opposite in polarity to those generated in the second region from being drawn from the signal electrodes in the first and third regions according to the present invention is formed by the opposition of the first and second signal electrodes 85 and 86 only in the second region 82B and/or the unpolarized structures of the first and third regions 82A and 82C according to the third embodiment.

Fourth Embodiment

FIG. 9 is a perspective view for illustrating an acceleration sensor 91 according to a fourth embodiment of the present invention, whose sensor body 92 is a modification of the sensor body 82 according to the third embodiment. Therefore, only points of the sensor body 92 which are different from the sensor body 82 according to the third embodiment are described while portions identical to those in FIG. 8 are denoted by the same reference numerals, to omit redundant description.

In the sensor body 92, first and second piezoelectric ceramic plates 93 and 94 are pasted to each other through an intermediate electrode 87. The intermediate electrode 87 is arranged only in a second region 92B. Further, first and second signal electrodes 85 and 86 are opposed to each other only in the second region 92B.

On the other hand, the piezoelectric ceramic plates 93 and 94 are polarized in opposite directions in the second region 92B, similarly to the sensor body 82 according to the third embodiment. According to the fourth embodiment, however, the piezoelectric ceramic plates 93 and 94 are polarized also in first and third regions 92A and 92C in a similar manner to the second region 92B. In other words, the piezoelectric ceramic plates 93 and 94 are uniformly polarized along thicknesses thereof.

However, the first and second signal electrodes 85 and 86 are opposed to each other only in the second region 92B. Even if charges which are based on displacement of the sensor body 92 are generated on outer major surfaces of the piezoelectric ceramic plates 93 and 94 in the first and third regions 92A and 92C, therefore, these charges are not drawn from the signal electrodes 85 and 86.

Namely, the means for preventing charges which are opposite in polarity to those generated in the second region from being drawn from the signal electrodes in the first and third regions according to the present invention is formed by the opposition of the signal electrodes 85 and 86 only in the second region 92B.

Another Exemplary Manufacturing Method

The sensor body is formed by the first and second piezoelectric ceramic plates which are pasted to each other through the intermediate electrode in each of the acceleration sensors according to the first to fourth embodiments, and such a structure can be obtained by pasting mother piezoelectric ceramic plates to each other, similarly to the conventional acceleration sensor 1. When such ceramic plates are pasted to each other through an adhesive, however, the adhesive may not necessarily adhere to the overall surfaces of the ceramic plates in uniform thicknesses. In other words, the ceramic plates may have portions provided with no adhesive, or adhesive layers in relatively excessive thicknesses in dispersion. In this case, the piezoelectric ceramic plates are insufficiently bonded to each other in a structure obtained by cutting a mother sensor body which is bonded with holding members or the like, leading to dispersion in detection accuracy.

Figure 10:
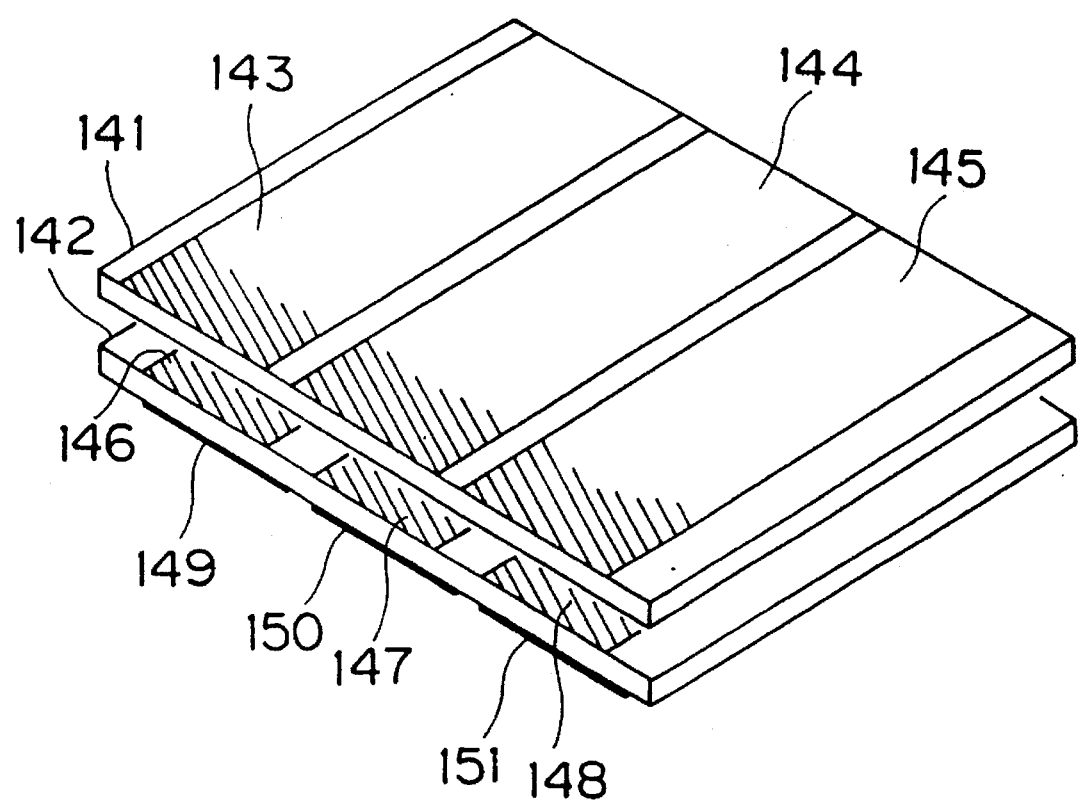
FIG. 10 is a perspective view for illustrating an exemplary method of manufacturing the acceleration sensor according to the present invention.

FIG. 10 is a perspective view for illustrating a manufacturing method for solving the aforementioned problem of a sensor body which is formed by pasting piezoelectric ceramic plates to each other through an adhesive.

Referring to FIG. 10, ceramic green sheets 141 and 142 are prepared by forming ceramic slurry. Conductive films 143, 144 and 145 are formed on an upper surface of the ceramic green sheet 141 by application of conductive paste or a thin film forming method. Other conductive films 146 to 148 are formed also on an upper surface of the ceramic green sheet 142 in a similar manner to the above. On the other hand, further conductive films 149 to 151 are formed on a lower surface of the ceramic green sheet 142, also in a similar manner to the above. The conductive films 143 to 145 and 149 to 151 correspond to mother electrodes for forming the aforementioned signal electrodes, while the conductive films 146 to 148 correspond to mother electrode patterns for forming intermediate electrodes.

The ceramic green sheets 141 and 142 are stacked with each other and pressurized along thicknesses thereof, and thereafter cut along the thicknesses to form independent sensor bodies, thereby obtaining unfired sensor body chips. Thereafter the unfired sensor body chips are so fired as to obtain sintered bodies which can be employed as sensor bodies in the first to fourth embodiments. Namely, the method descried above with reference to FIG. 10 utilizes a well-known method of manufacturing a ceramic multilayer electronic part. Due to this manufacturing method, dispersion is hardly caused in bonding between the first and second piezoelectric ceramic plates, whereby it is possible to provide an acceleration sensor having small dispersion in detection sensitivity. Further, it is possible to form a smaller sensor body by utilizing the aforementioned method of manufacturing a ceramic multilayer electronic part.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An acceleration sensor comprising:

an acceleration sensor body formed of a bimorph piezoelectric ceramic element and having a specific insensitive direction along which no acceleration is detectable; and a case supporting said sensor body as a center beam and having a mounting surface to be mounted on an external device, said sensor body being so supported by said case that said insensitive direction is along a direction being neither parallel nor perpendicular to said mounting surface of said case.

2. An acceleration sensor in accordance with claim 1, wherein said bimorph piezoelectric ceramic element comprises first and second piezoelectric ceramic plates, each ceramic plate having first and second major surfaces separated by a thickness, said ceramic element comprising:

a first signal electrode being formed on said first major surface of said first piezoelectric ceramic plate, a second signal electrode being formed on said first major surface of said second piezoelectric ceramic plate, and an intermediate electrode being arranged between said second major surfaces of said first and second piezoelectric ceramic plates, said second surfaces of said first and second piezoelectric ceramic plates being bonded to each other through said intermediate electrode.

3. An acceleration sensor in accordance with claim 2, wherein said first and second piezoelectric ceramic plates are polarized in a direction of polarization perpendicular to said first and second major surfaces, respectively, each plate being polarized uniformly along said thicknesses thereof, the directions of polarization of said plates being opposite each to the other.

4. An acceleration sensor in accordance with claim 2, wherein said sensor body has first, second and third regions, said second region being central to said first and third regions, such that stress is caused in different directions in adjacent ones of said regions upon acceleration of said sensor, and said first and second piezoelectric ceramic plates are polarized in a direction of polarization perpendicular to said major surfaces, said plates being polarized in mutually opposite directions of polarization in said second region, said acceleration sensor further comprising means for preventing charges generated in said sensor body which are opposite in polarity to those generated in said second region from being drawn from said signal electrodes.

5. An acceleration sensor in accordance with claim 4, wherein said first and second piezoelectric ceramic plates are polarized in said first and third regions in directions of polarization opposite to those in said second region, respectively, and said first and second signal electrodes are so formed that portions are mutually opposed to each other on either first major surface of said first and second piezoelectric ceramic plates, along said first, second and third regions, whereby charges generated in said first and third regions that are identical in polarity to those generated in said second region are drawn from said first and second signal electrodes.

6. An acceleration sensor in accordance with claim 4, wherein said means for preventing charges generated in said sensor body which are opposite in polarity to those generated in said second region from being drawn from said signal electrodes is that said first and second signal electrodes are mutually opposed to each other on either first major surface of said first and second piezoelectric ceramic plates only in said second region.

7. An acceleration sensor in accordance with claim 6, wherein said first and third regions are not polarized.

8. An acceleration sensor in accordance with claim 6, wherein said first and second piezoelectric ceramic plates are uniformly polarized along said thicknesses thereof.

9. A mounting structure for an acceleration sensor comprising:

an acceleration sensor body having a specific insensitive direction along which no acceleration is detectable; and a mounting member supporting said sensor body as a center beam and having a mounting surface to be mounted on an external device, said acceleration sensor body being so supported that said insensitive direction of said acceleration sensor body is neither parallel nor perpendicular to said mounting surface of said mounting member.

10. An acceleration sensor in accordance with claim 1, wherein said case further comprises first and second holding members, said first and second holding members being fixed to said sensor body for holding said sensor body from both sides along said thicknesses of said first and second piezoelectric ceramic plates.

11. An acceleration sensor in accordance with claim 2 wherein said first and second piezoelectric ceramic sheets are formed from ceramic green sheets, said sensor body being formed by a sintered body obtained by stacking first and second ceramic green sheets with an intermediate electrode in between and integrally firing the same.

12. An acceleration sensor in accordance with claim 9, wherein said acceleration sensor body is a bimorph piezoelectric element.

13. An acceleration sensor in accordance with claim 12, wherein said bimorph piezoelectric element comprises:

a first signal electrode being formed on a first major surface of said first piezoelectric ceramic plate, a second signal electrode being formed on a first major surface of said second piezoelectric ceramic plate, and an intermediate electrode being arranged between second major surfaces of said first and second piezoelectric ceramic plates, said first and second piezoelectric ceramic plates being bonded to each other through said intermediate electrode.

14. An acceleration sensor in accordance with claim 1, wherein said case is made of insulating materials.

* * * * *